US011485399B2

(12) United States Patent
Salter et al.

(10) Patent No.: US 11,485,399 B2
(45) Date of Patent: Nov. 1, 2022

(54) HEATED VEHICLE STEERING WHEEL HAVING MULTIPLE HEATERS WITH INTEGRATED SENSORS

(71) Applicant: Ford Global Technologies, LLC, Dearborn, MI (US)

(72) Inventors: Stuart C. Salter, White Lake, MI (US); Pietro Buttolo, Dearborn Heighls, MI (US); James Robert Chascsa, II, Farmington Hills, MI (US); Darren Palmer, Bloomfield Hills, MI (US); Katherine Howard-Cone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 17/016,771

(22) Filed: Sep. 10, 2020

(65) Prior Publication Data
US 2022/0073122 A1   Mar. 10, 2022

(51) Int. Cl.
*B62D 1/06* (2006.01)
*H05B 3/20* (2006.01)
*H05B 3/03* (2006.01)
*G01L 1/14* (2006.01)
*H05B 3/36* (2006.01)

(52) U.S. Cl.
CPC .............. *B62D 1/065* (2013.01); *G01L 1/142* (2013.01); *H05B 3/03* (2013.01); *H05B 3/20* (2013.01); *H05B 3/36* (2013.01)

(58) Field of Classification Search
CPC ......... B62D 1/046; B62D 1/065; G01L 1/142; H05B 1/0236; H05B 2203/005; H05B 3/03; H05B 3/20; H05B 3/36; H05B 3/58
See application file for complete search history.

(56) References Cited

U.S. PATENT DOCUMENTS

| 6,392,195 | B1 | 5/2002 | Zhao et al. |
| 6,441,344 | B1 | 8/2002 | Bonn et al. |
| 6,815,642 | B2 | 11/2004 | Haag et al. |
| 7,019,261 | B2 | 3/2006 | Worrell et al. |
| 8,993,929 | B2 | 3/2015 | Maranville et al. |
| 10,323,818 | B2 | 6/2019 | Salter et al. |
| 10,449,989 | B2 | 10/2019 | Nishio et al. |
| 10,528,201 | B2 | 1/2020 | Leigh et al. |
| 2011/0226751 | A1* | 9/2011 | Lazanja ................. A47C 7/748 219/217 |

(Continued)

FOREIGN PATENT DOCUMENTS

WO     02094634 A1    11/2002

*Primary Examiner* — Dana Ross
*Assistant Examiner* — Joe E Mills, Jr.
(74) *Attorney, Agent, or Firm* — Vichit Chea; Price Heneveld LLP

(57) ABSTRACT

A vehicle steering wheel is provided that includes a rim having a core structure, a plurality of heating zones surrounding at least a portion of the core structure, each heating zone having conductive circuitry to define a heater and a capacitive sensor for sensing location of a user's hand on the steering wheel, and a controller controlling the conductive circuitry in each heating zone to operate as the capacitive sensor to sense a presence of the user's hand in at least one heating zone and to switch to operate as the heater to heat the at least one heating zone when the hand is sensed in the at least one heating zone.

18 Claims, 10 Drawing Sheets

(56) References Cited

U.S. PATENT DOCUMENTS

| | | | |
|---|---|---|---|
| 2014/0253151 A1* | 9/2014 | Kandler | G01L 1/144 |
| | | | 324/686 |
| 2014/0339211 A1* | 11/2014 | Barfuss | B60N 2/002 |
| | | | 219/202 |
| 2017/0355391 A1 | 12/2017 | Wittkowski et al. | |
| 2018/0229752 A1 | 8/2018 | Chascsa, II et al. | |
| 2019/0185039 A1 | 6/2019 | Park et al. | |
| 2019/0256125 A1 | 8/2019 | Ostrowski et al. | |

* cited by examiner

HEATED VEHICLE STEERING WHEEL HAVING MULTIPLE HEATERS WITH INTEGRATED SENSORS

FIELD OF THE DISCLOSURE

The present disclosure generally relates to vehicle steering wheels, and more particularly relates to heated steering wheels.

BACKGROUND OF THE DISCLOSURE

Motor vehicles are commonly equipped with a steering wheel that may be heated with an electric heater. The heater, typically in the form of an electric heater mat, generally extends over a substantial portion of the steering wheel rim such that a substantial portion of the steering wheel rim is heated when the heater is activated. However, it may be desirable to heat lesser portions of the steering wheel to reduce energy consumption, particularly for electric vehicles.

SUMMARY OF THE DISCLOSURE

According to a first aspect of the present disclosure, a vehicle steering wheel is provided. The vehicle steering wheel includes a rim having a core structure, a plurality of heating zones surrounding at least a portion of the core structure, each heating zone having conductive circuitry to define a heater and a capacitive sensor for sensing location of a user's hand on the steering wheel, and a controller controlling the conductive circuitry in each heating zone to operate as the capacitive sensor to sense a presence of the user's hand in at least one heating zone and to reconfigure the conductive circuitry to operate as the heater to heat the at least one heating zone when the hand is sensed in the at least one heating zone.

Embodiments of the first aspect of the disclosure can include any one or a combination of the following features:
  the conductive circuitry operating as the capacitive sensor also operates as the heater;
  switching circuitry for selectively switching operation of the conductive circuitry between the capacitive sensor and the heater;
  the controller controls the switching circuitry to switch operation of the conductive circuitry between the capacitive sensor and the heater;
  the conductive circuitry comprises a first electrode comprising a first plurality of electrode fingers and a second electrode comprising a second plurality of electrode fingers, and wherein the first plurality of conductive fingers are interdigitated with the second plurality of conductive fingers;
  a third electrode and a compliant layer disposed between each of the first and second electrodes and the third electrode;
  the controller senses pressure applied to the heating zone and adjusts the heating level based on the sensed pressure;
  the conductive circuitry comprises at least one electrode that generates a capacitive signal for the capacitive sensor and generates heat for the heater;
  a cover wrap surrounding the conductive circuitry;
  the heater operates as a resistive heater that generates heat based on electric current;
  the conductive circuitry comprises an electric heater mat; and
  the core structure comprises a rigid core and a surrounding compliant layer.

According to a second aspect of the present disclosure, a vehicle steering wheel is provided. The vehicle steering wheel includes a rim having a core structure, a plurality of heating zones surrounding at least a portion of the core structure, each heating zone having conductive circuitry to define a heater and a capacitive sensor for sensing location of a user's hand on the steering wheel, a cover wrap surrounding the plurality heating zones, and a controller controlling the circuitry in each heating zone to operate as the capacitive sensor to sense a presence of the user's hand in at least one heating zone and to reconfigure the conductive circuitry to operate as the heater to heat the at least one heating zone when the hand is sensed in the at least one heating zone.

Embodiments of the second aspect of the disclosure can include any one or a combination of the following features:
  the conductive circuitry operating as the capacitive sensor also operates as the heater;
  switching circuitry for selectively switching operation of the conductive circuitry between the capacitive sensor and the heater;
  the controller controls the switching circuitry to switch operation of the conductive circuitry between the capacitive sensor and the heater;
  the conductive circuitry comprises at least one electrode that generates a capacitive signal for the capacitive sensor and generates heat for the heater;
  the capacitive sensor comprises a first electrode comprising a first plurality of electrode fingers and a second electrode comprising a second plurality of electrode fingers, and wherein the first plurality of conductive fingers are interdigitated with the second plurality of conductive fingers;
  the core structure comprises a rigid core, a third electrode, and a surrounding compliant layer disposed between each of the first and second electrodes and the third electrode to sense pressure applied to the heating zone and adjusts the heating based on the sensed pressure; and
  the heater operates as a resistive heater that generates heat based on electric current.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
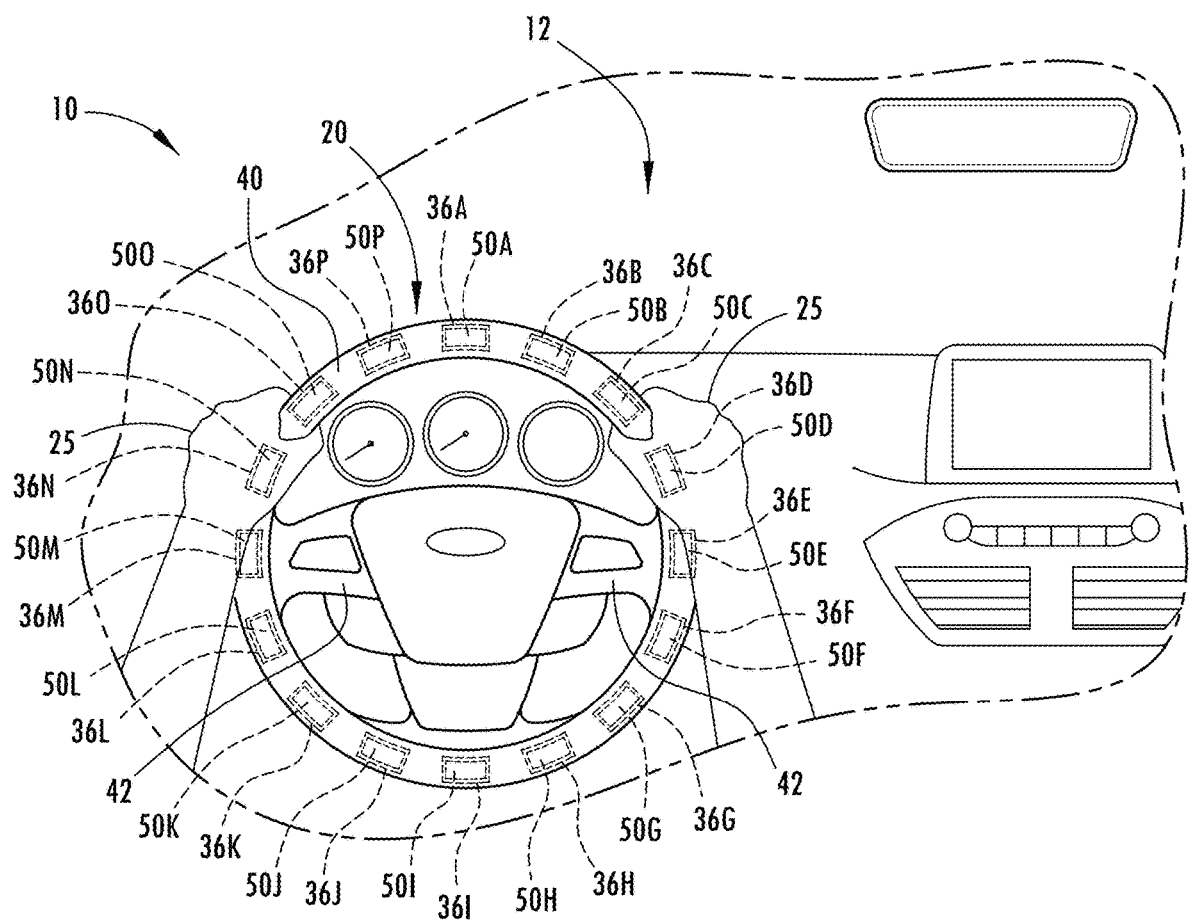
FIG. 1 is a front perspective view of the interior of an automotive vehicle having a heated steering wheel having heating zones with conductive circuitry reconfigurable as capacitive sensors and heaters, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a heated vehicle steering wheel. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-5, a heated steering wheel 20 is generally illustrated located in a motor vehicle 10. The heated steering wheel 20 includes a rim having a core structure, a plurality of heating zones surrounding at least a portion of the core structure, each heating zone having conductive circuitry that is reconfigurable via switches to define a heater for heating a heating zone and a capacitive sensor for sensing location of a user's hand on the steering wheel. A controller controls the conductive circuitry in each heating zone to operate as the capacitive sensor to sense a presence of the user's hand in the corresponding heating zone and to switch to operate as the heater to heat the corresponding heating zone when the hand is sensed.

Referring to FIG. 1, the motor vehicle 10 is generally illustrated having the heated steering wheel 20, according to one embodiment. The vehicle 10 may be a wheeled motor vehicle having a steering wheel 20 for steering the direction of the steerable wheels, such as for a car, a truck, a van, a bus, a sport utility vehicle (SUV) or for steering other steerable vehicles having a steering wheel such as a boat. The vehicle 10 is shown having a body defining a passenger compartment 12 having one or more seats configured to seat one or more passengers. The steering wheel 20 is typically positioned in front of a driver's seat to enable the seated driver to engage and operate the steering wheel 20 with his or her hands 25 to rotate the steering wheel 20 in clockwise and counterclockwise directions. The steering wheel 20 is generally shown extending vehicle rearward from a dashboard and is forward of a driver seat as is common in driver steered vehicles.

Figure 2:
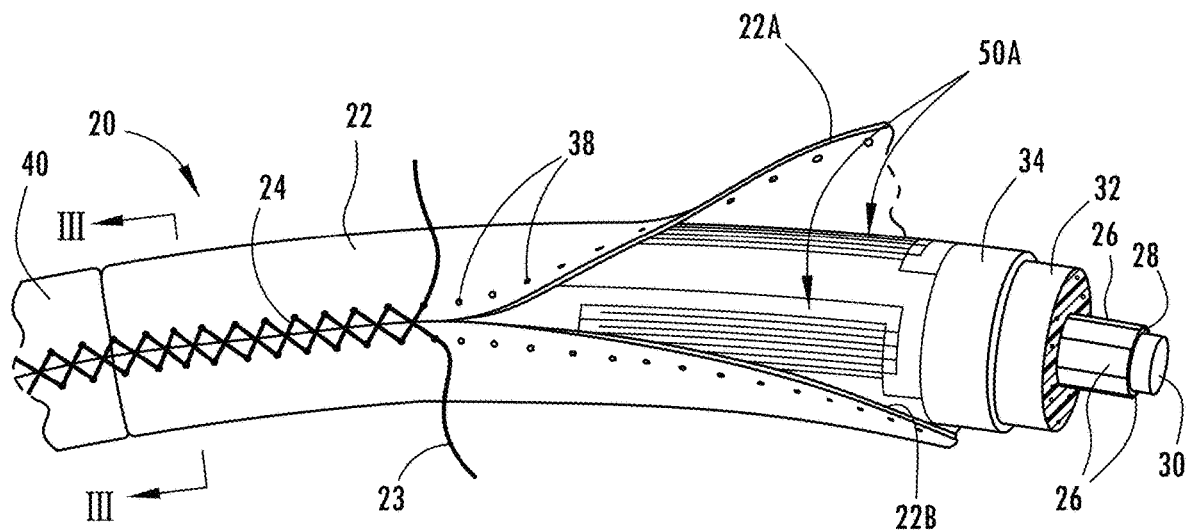
FIG. 2 is an enlarged view of a partially assembled portion of the heated steering wheel shown in FIG. 1.

With particular reference to FIGS. 1 and 2, the steering wheel 20 is shown having a ring-shaped rim 40 and one or more spokes 42 or other connecting structure that interconnects the rim 40 with a steering wheel shaft that rotates with rotation of the steering wheel 20. A steering wheel angle sensor, such as an optical sensor, may be provided or coupled to the steering wheel shaft to sense rotational position of the steering wheel 20. Various components may be assembled onto the one or more spokes 42 including an operator actuatable horn, and other inputs, such as radio inputs, HVAC inputs, speed control inputs, and other controls.

The steering wheel 20 includes a plurality of heating zones 36A-36P located at different angular positions on the rim 40. The plurality of heating zones 36A-36P are shown equi-angularly disposed along the rim 40 of the steering wheel 20, according to one example. Each of the heating zones 36A-36P may extend on a portion or the entire circumference of the steering wheel rim 40. In one embodiment, each heating zone has four heating zones, namely heating zones on the front, back, top and bottom sides of the rim 40. Each of the plurality of heating zones 36A-36P have conductive circuitry 50A-50P that is reconfigurable to operate as a capacitive sensor and a heater that is independently energizeable via electric power to heat the corresponding heater zone which extends over a portion of the steering wheel 20.

Disclosed on the rim 40 are the plurality of conductive circuitries 50A-50P which are selectable to operate as a capacitive sensor for sensing an object, such as a user's hand or hands located on the rim 40 such as occurs when a user's hands grip the rim 40 or otherwise contact the rim 40 and to operate as a heater to heat the corresponding heating zone. Each of the conductive circuitries 50A-50P is located in a corresponding heating zone 36A-36P such that when configured as capacitive sensors sense an object relative or proximate to one of the heating zones 36A-36P. When the conductive circuitry 50A-50P senses an object indicative of a hand of a driver engaging the rim 40 within a heating zone, a controller activates switches to selectively reconfigure the conductive circuitry 50A-50P in that heating zone to operate as one or more heaters so as to heat the heating zone which is a portion only of the rim 40 thereby heating the zone(s) where the hand is generally engaging the rim 40. For example, when a hand is detected engaging the rim, the corresponding heater(s) are energized and the remaining heater(s) are de-energized such that only the portion of the steering wheel rim 40 engaged by the hand is heated. This results in reduced electrical energy consumption, which is particularly useful for electric powered vehicles, but is also useful for conserving energy on gas powered vehicles.

Figure 3:
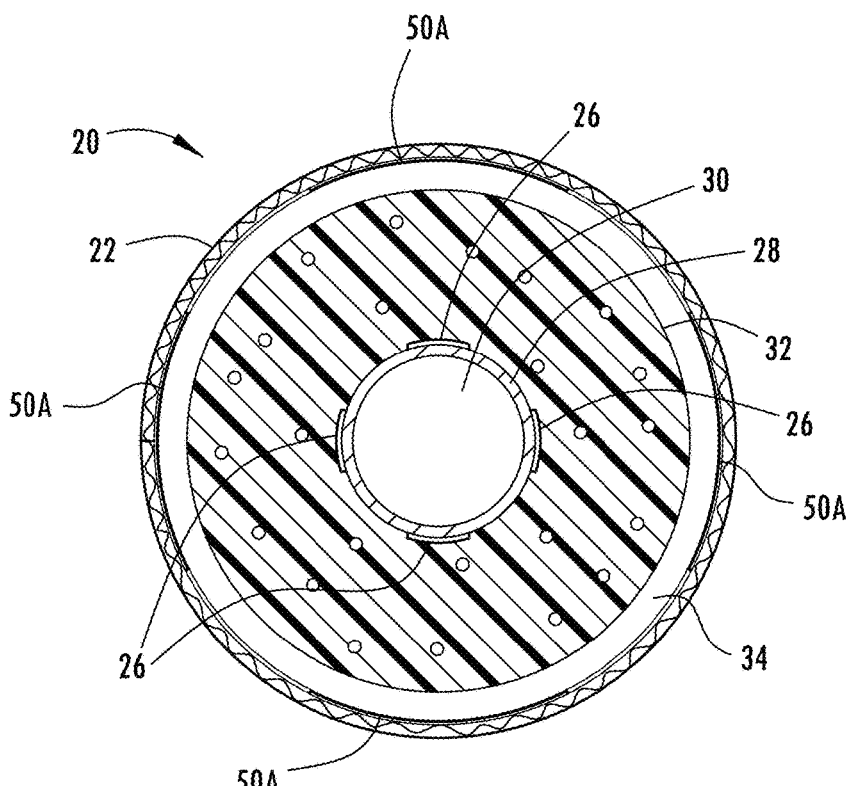
FIG. 3 is a cross-sectional view taken through line of FIG. 2 further illustrating the layers of the steering wheel.

Referring to FIGS. 2 and 3, a portion of the ring-shaped rim 40 of the steering wheel 20 is generally illustrated partially assembled so as to illustrate the various layers of the steering wheel 20. The steering wheel 20 includes a rigid core 30 which is shown in a generally cylindrical shape which may be made of magnesium or aluminum, according to some examples. The core 30 may also be referred to as an armature for providing structural support and shape to the steering wheel 20. Surrounding the core 30 is a dielectric layer 28. Located on top of dielectric layer 28 on the top, bottom, front and back sides of the rim 40 are four conductive electrodes 26 which are referred to as third electrodes. A compliant layer 32 surrounds the dielectric layer 28 and conductive electrodes 26 and may be made of polyurethane or foam. The compliant layer 32 may have a generally cylindrical shape and provides compressibility with memory that allows for a soft or cushioned feel to the steering wheel 20. The compliant layer 32, dielectric layer 28, conductive electrodes 26 and core 30 together provide a core structure of the steering wheel 20.

A thermal insulative dielectric layer 34 may be disposed on top of the compliant layer 32. The plurality of conductive circuitries 50A-50P are disposed or wrapped around dielectric layer 34. Each of the conductive circuitries 50A-50P extends throughout a respective heating zone 36A-36P of the rim 40. Conductive circuitry 50A is shown as four conductive circuitries located on the front, back, top and bottom sides of the rim 40. The remaining conductive circuitries 50B-50P may likewise be configured with circuits. According to one embodiment, the conductive circuitries 50A-50P may be integrated into electric powered mats that may be powered via electricity provided by the one or more vehicle batteries, for example. The plurality of conductive circuitries 50A-50P may extend around a substantial portion of the core structure to define the sensor/heater portions of the steering wheel 20. An optional electrically non-conductive dielectric layer may be disposed on top of the plurality of conductive circuitries 50A-50P and may extend over all of the conductive circuitries 50A-50P so as to provide a backing for an overlaid cover wrap and capacitive sensors and dielectrically isolate the conductive circuitry. The dielectric layer may include a thin electrically/dielectric sheet of material, such as fleece or polyester that covers the conductive circuitries 50A-50P and allows thermal energy (heat) to pass through to the cover wrap 22. The dielectric layer may provide thermal conductivity for enhanced thermal transmission.

A cover wrap 22 is provided over the top of the plurality of conductive circuitries 50A-50P completely covering the core structure of the rim 40. The cover wrap 22 may be stitched together along a stitch seam 24 where first and second edges 22A and 22B of the cover wrap 22 may abut one another and are joined together along the stitch seam 24. The stitch seam 24 may include stitching 23 extending through holes 38. It should be appreciated that the cover wrap 22 may include leather, according to one example, or vinyl, according to another example.

The plurality of conductive circuitries 50A-50P each may include single layer circuitry with electrically conductive electrodes and heating material, such as copper wire sewn into a printed-on layer, according to one embodiment. The conductive circuitries 50A-50P may each include multiple layers forming the capacitive sensor and heater as a mat, according to another embodiment. In a multiple layer heater, the electrically conductive circuitry may be fabricated on one side or between multiple layers.

Figure 4:
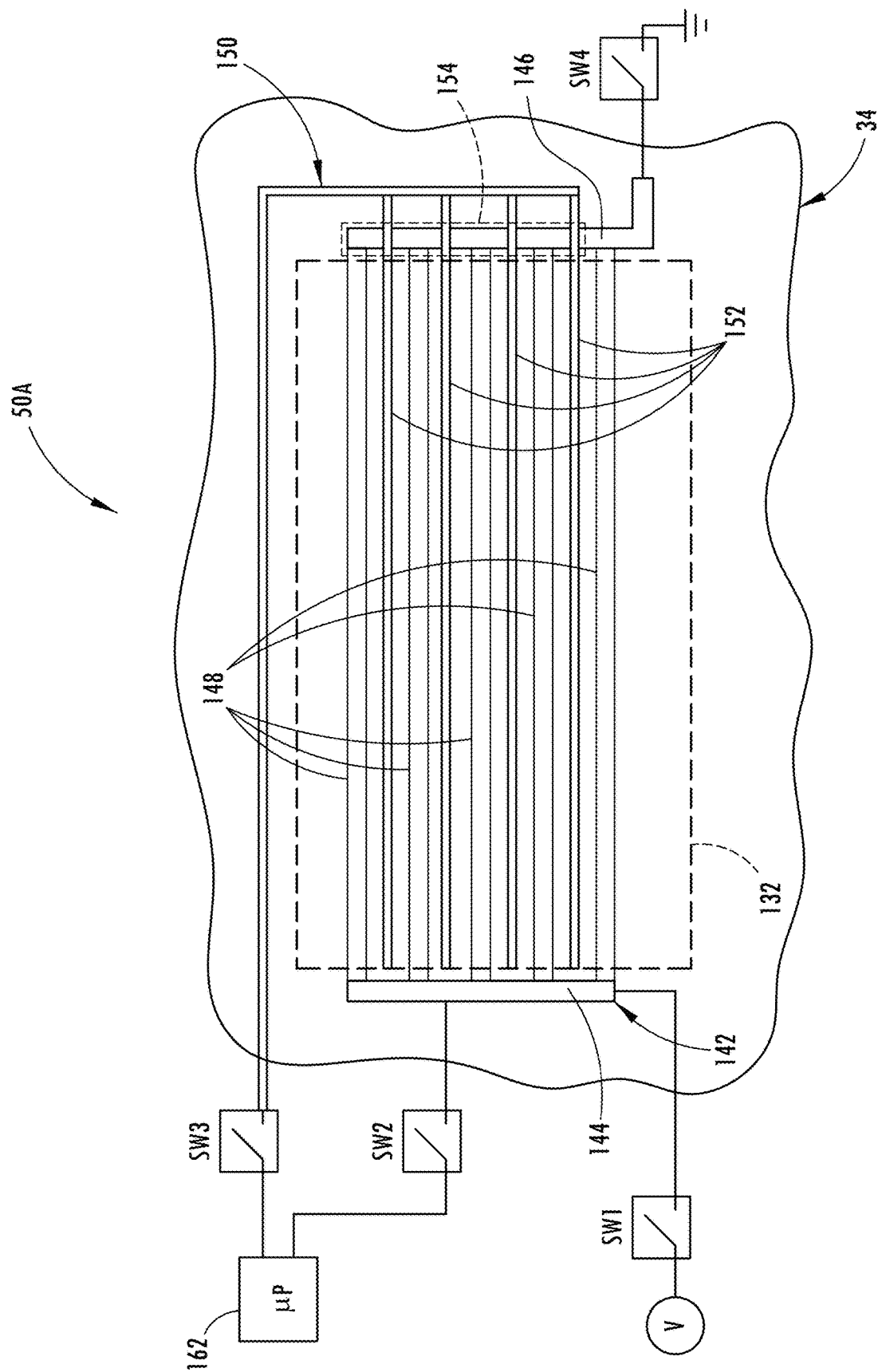
FIG. 4 is a circuit diagram illustrating one of the conductive circuitries with integrated capacitive sensors and heaters, according to the one embodiment.

The conductive circuitry 50A and control circuitry for controlling the conductive circuitry 50A is illustrated in FIG. 4. The conductive circuitry 50A is made up of an electrically conductive material that allows electrical current and signals to be transmit thereon. The conductive circuitry 50A includes a first electrode 142 having a first plurality of electrode fingers 148 shown extending between the conductive lines 144 and 146. The conductive circuitry 50A also includes a second electrode 150 having a second plurality of electrode fingers 152 that are electrically isolated or dielectrically isolated from the first plurality of electrode fingers 148. The first and second plurality of electrode fingers 148 and 152 are interdigitated so as to form a capacitive coupling therebetween when configured as a capacitive sensor. A dielectric layer 154 is disposed between electrode fingers 152 and connecting line 146 to allow the signal lines to cross over without making electrical connections. As such, the second electrode 150 and corresponding electrode fingers 152 are dielectrically isolated from connecting line 146 and the first electrode 142 and corresponding electrode fingers 148.

Switching circuitry including a plurality of switches, shown as first switch SW1, second switch SW2, third switch SW3, and fourth switch SW4 are illustrated connected to the conductive circuitry 50A to control switching of the conductive circuitry 50A between the capacitive sensor and heater operations. Each of the switches SW1-SW4 may be controlled by control circuitry including a microprocessor 162 as shown. The first switch SW1 connects the first electrode 142 via connecting line 144 to a voltage source shown as V such as the vehicle battery. The fourth switch SW4 is shown connecting the first electrode 142 via the connecting line 146 to ground. As such, when the first switch SW1 and fourth switch SW4 are in the closed positions for the heater operation, the electrical voltage V is applied across the first electrode 142 from the first connecting line 144 across fingers 148 to the second connecting line 146 and to ground to cause electric current to flow therethrough and generate heat across the first electrode 142 to operate as a heater. At the same time, switches SW2 and SW3 are in the open position during the heater operation. It should be appreciated that electrical current passing through the first electrode 142 generates heat due to the electrical resistance of the circuit which forms a resistive heater for generating thermal energy (heat).

The conductive circuitry 50A may also be configured to operate in a sensing operation as a capacitive sensor to sense when a hand is detected contacting or gripping the corresponding heating zone 50A-50P on the steering wheel, and then the conductive circuitry 50A may be switched to the heater configuration to heat that heating zone. In order to operate as a capacitive sensor, the conductive circuitry 50A is controlled by opening the first switch SW1 and the fourth switch SW4 and closing the second switch SW2 and the third switch SW3. With the first and fourth switches SW1 and SW4 open, electrical power from the voltage V is removed and with the second and third switches SW2 and SW3 closed, the microprocessor 162 is able to control drive and receive signals to and from the first and second electrodes 142 and 150 so as to generate a capacitive activation field for sensing the presence of a hand on that region of the steering wheel.

When configured to operate as a capacitive sensor, the conductive circuitry 50A employs the first electrode 142 as a drive electrode and the second electrode 150 as a receive electrode, each having interdigitated fingers 148 and 152, respectively, for generating a capacitive field. According to one embodiment, the first electrode 142 receives square wave drive signal pulses applied at a voltage. The second electrode 150 has an output for generating an output voltage. It should be appreciated that the first and second electrodes 142 and 150 and corresponding electrode fingers 148 and 152 may be arranged in various configurations for generating the capacitive fields as the sense activation fields, according to various embodiments. It should also be appreciated that the first and second electrodes 142 and 150 may otherwise be configured so that other types of single electrode sensors or other multiple electrode sensors may be used. The conductive circuitry 50A may be formed with conductive ink or may be alternatively be formed with rigid or flexible circuitry.

According to one embodiment, the first electrode 142 is supplied with an input voltage as square wave signal pulses having a charge pulse cycle sufficient to charge the second electrode 150 to a desired voltage. The second electrode 150 thereby serves as a measurement electrode. When a hand is detected via touch or pressure, the hand or pressure causes a disturbance in the activation field which generates a signal that is processed to determine the presence or pressure of the hand. The disturbance of the activation field is detected by processing the charge pulse signals.

The first and second electrodes 142 and 150 and corresponding first and second plurality of conductive fingers 148 and 152, respectively, may be formed on a substrate, such as layer 34. The first electrode 142 may be disposed on or adhered via an adhesive onto the inner surface of the substrate, according to one example. The second electrode 150 is also disposed onto the substrate such that the second plurality of fingers 152 is interdigitated with the first plurality of fingers 148. In order to prevent short circuiting of the first and second electrodes 142 and 150, a dielectric layer 154 is disposed between the first and second electrodes 142 and 150 on the inner surface of connecting line 146 such that the second electrode 150 and second plurality of conductive fingers 152 are separated from the first electrode 142. The remainder of the first and second electrodes 142 and 150 and conductive fingers 148 and 152 are substantially coplanar on the inner surface of the substrate. It should be appreciated that the dielectric layer 154 may be enlarged to cover substantially more or all of the surface area between the first and second electrodes, according to other embodiments.

Figure 5:
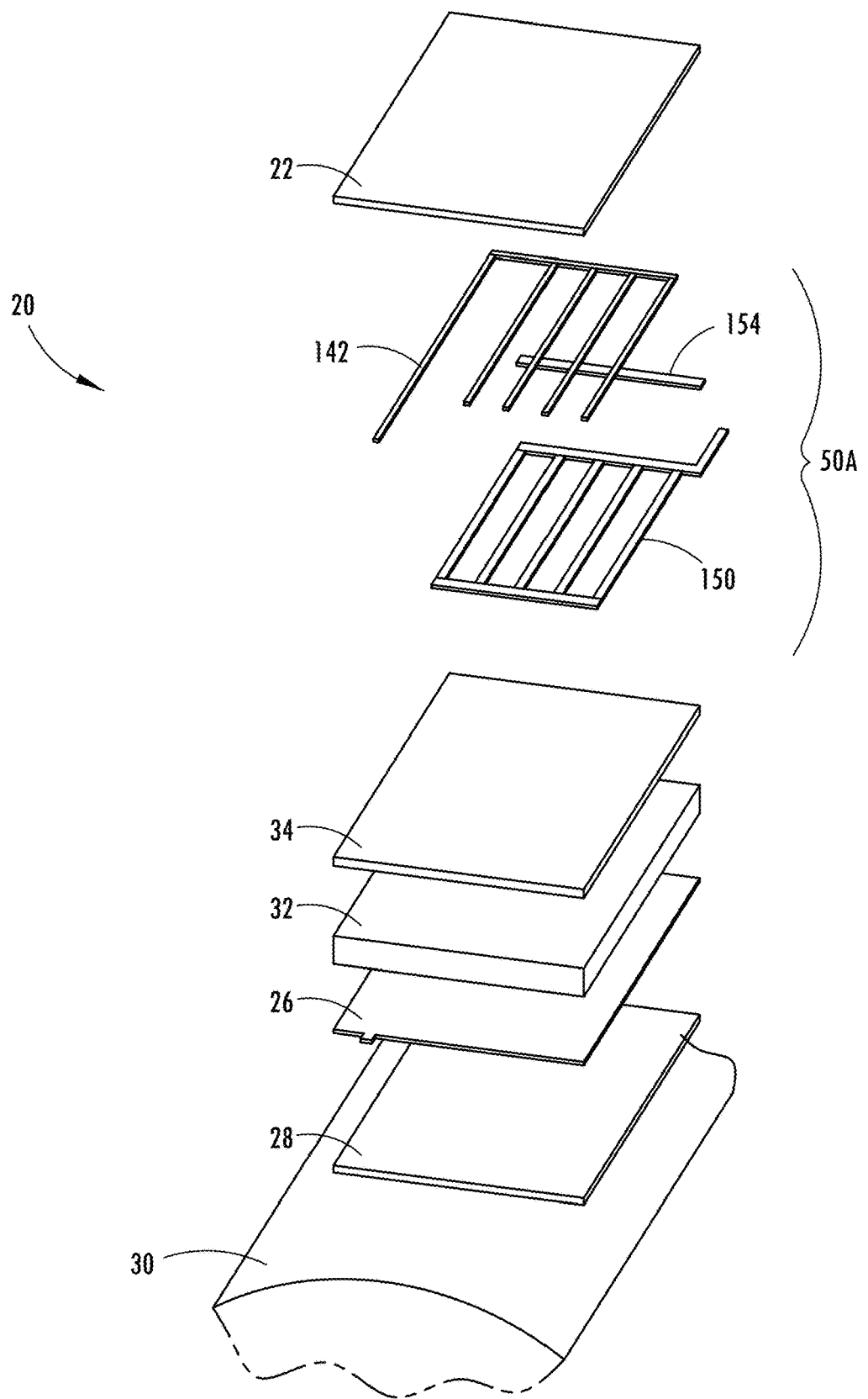
FIG. 5 is an exploded upper front perspective view of one of the conductive circuitries, according to one embodiment.

Referring to FIG. 5, conductive circuitry 50A is shown provided on one of the four sides about the circumference of the rim 40 of the steering wheel 4. Conductive circuitry 50A may be provided on a front side, a rear side, a top side, and a bottom side of the rim 40. As such, a user's hand may be detected and heated on the front, top, back and bottom sides of the rim 40 of the steering wheel 20 by using all four conductive circuitries 50A positioned on each of the four sides. It should be appreciated that the proximity or touch of the user's hand on one or more of the conductive circuitry when configured as a capacitive sensor may be detected and that the user's hand may squeeze and pressure applied thereto may be detected with the capacitive sensor. The remaining conductive circuitries 50B-50P may be configured the same as conductive circuitry 50A.

The conductive circuitry 50A representation of each of conductive circuitries 50A-50P is shown, according to the first embodiment in FIG. 5. The conductive circuitry 50A includes three electrodes configured to operate in different sensor modes or states by using a controller to reconfigure the input and output sampling of the signals generated by the various electrodes to operate in different sensor configurations to provide up to three capacitive sensors that may operate as a mutual capacitive sensor or a self-capacitive sensor and to sense input commands, such as touch, proximity and pressure (force/area) or force.

The arrangement of the electrodes in the conductive circuitry 50A has first and second electrodes 142 and 150 arranged within a common layer and dielectrically isolated from one another via a separation distance. The first electrode 142 has a first plurality of conductive fingers and the second electrode 150 has a second plurality of conductive fingers. The first plurality of conductive fingers are interdigitated or interleaved with the second plurality of conductive fingers. As a result, the first and second electrodes 142 and 150 may be configured to operate in a first mode as a mutual capacitance sensor when one of the electrode signal terminals is driven with a drive signal and the other of the electrode signal terminals generates a receive signal when operated in a mutual capacitance mode. When one of the electrode signal terminals receives a drive signal, that electrode operates as a drive electrode and the other electrode operates as a receive electrode. The drive electrode may receive square wave drive pulses applied at a voltage $V_I$. The receive electrode may have an output for generating an output voltage $V_O$. It should be appreciated that the first and second electrodes 142 and 150 may be arranged in various other configurations for generating a capacitive electric field as an activation field.

In the mutual capacitance sensor mode, the drive electrode is applied with voltage input $V_O$ as square wave pulses having a charge pulse cycle sufficient to charge the receive electrode to a desired voltage. The receive electrode thereby serves as a measurement electrode. When a user or operator, such as a user's finger, enters the activation electric field generally proximate the top front side of the proximity sensor assembly, the proximity sensor assembly detects the disturbance caused by the finger to the activation electric field and determines whether the disturbance is sufficient to detect a touch input sufficient to activate a proximity switch or generate a desired output. The disturbance of the activation electric field is detected by processing the charge pulse signal associated with the corresponding signal.

An overlying dielectric cover 22 is provided on the top front side of the first and second electrodes 142 and 150 to provide dielectric isolation and protection of the first and second electrodes 142 and 150. The dielectric cover 22 may include any dielectric materials, such as a dielectric polymer or plastic, leather, wood, a trim component or other dielectric medium. It should be appreciated that the first and second electrodes 142 and 150 may be formed by printing conductive ink in the desired patterns of the electrodes. The ink may be printed on the rear surface of the dielectric cover 22, according to one embodiment or may be printed on the front surface of the dielectric layer 34 therebelow. The first and second electrodes 142 and 150 may otherwise be formed by placing preformed conductive electrodes between the dielectric cover 22 and the dielectric layer 34.

Disposed below the first and second electrodes 142 and 150 and dielectric layer 34 is the compliant dielectric layer 32. The compliant dielectric layer 32 has a relatively soft material that is compliant and deformable when pressure, which is force applied over an area, is applied to the front of the cover 22 so as to squeeze and deform the compliant dielectric layer 32. According to one example, the compliant dielectric layer 32 may be a soft foam material.

Located below the compliant dielectric layer 32 is a third electrode 26. The third electrode 26 is shown formed as a sheet of conductive material, according to one embodiment. The third electrode 26 has a signal terminal to allow for communication of signals with the controller. The third electrode 26 may operate in one sensor mode as a mutual capacitive sensor that detects pressure applied to the top front surface which causes deformation of the compliant dielectric layer 32. As the compliant dielectric layer 32 is squeezed due to pressure and deforms, at least a portion of the pair of the first and second electrodes 142 and 150, which may be shorted together to form a single electrode or operated individually, moves towards the third electrode 26. When this occurs, the controller detects the relative position of the pair of first and second electrodes 142 and 150 relative to the third electrode 26. In other sensor modes, the third electrode 26 may be open circuited to operate as a shield for the first and second electrodes 142 and 150 located thereabove or the third electrode 26 located therebelow. When operated as a shield, the third electrode 26 may be open circuited such that there is no applied voltage applied or may be driven to a desired voltage, according to various embodiments.

A further bottom dielectric layer 28 is shown provided below the third electrode 26 so as to dielectrically isolate the third electrode 26 on the bottom side. In one embodiment, the bottom dielectric 28 may be a dielectric backing material.

Figure 6:
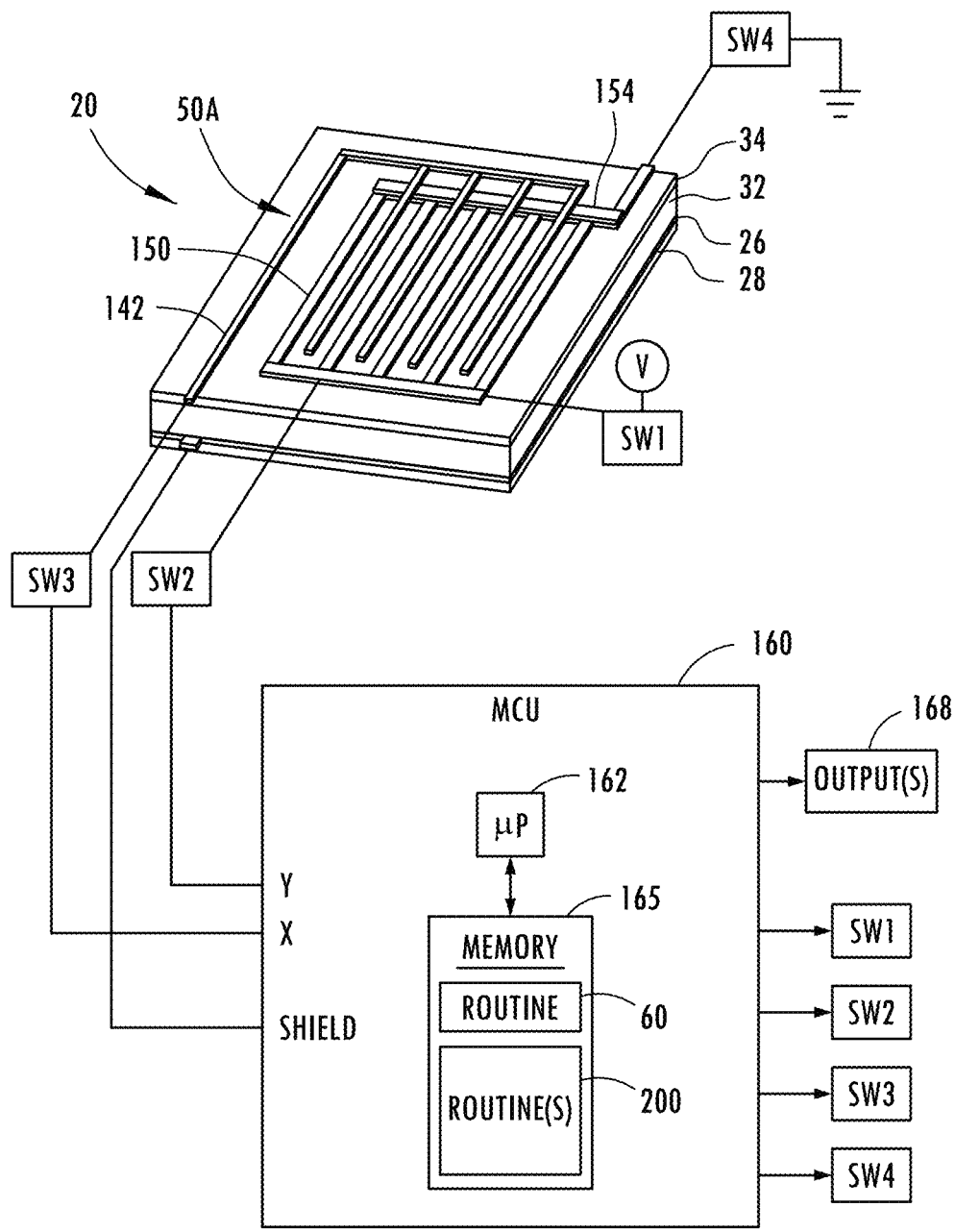
FIG. 6 is a front perspective view of the conductive circuitry shown in FIG. 5 with a controller configured to sample signals in a first capacitive sensor mode.
Figure 7:
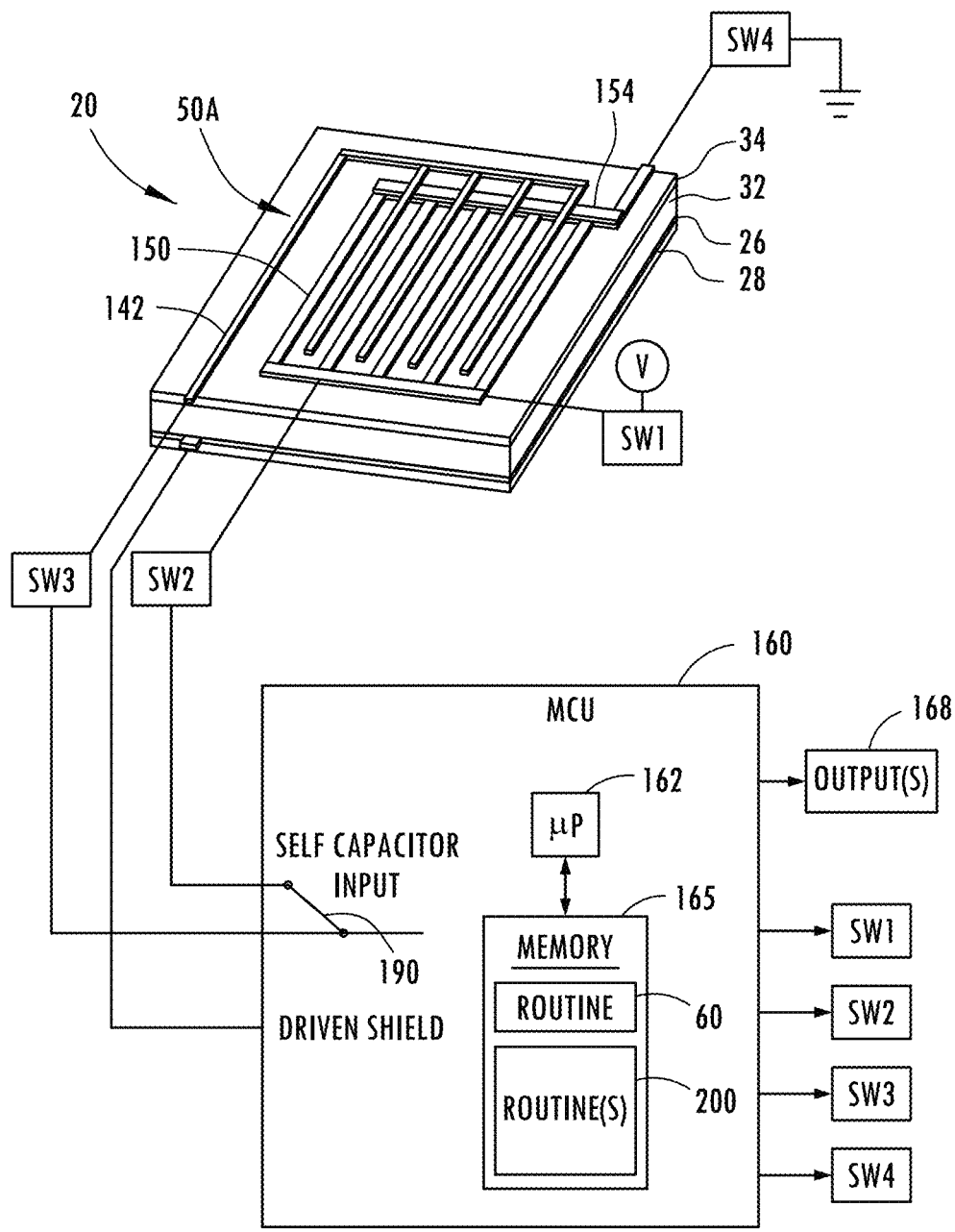
FIG. 7 is a front perspective view of the conductive circuitry shown in FIG. 5 with the controller configured to sample signals in a second capacitive sensor mode.
Figure 8:
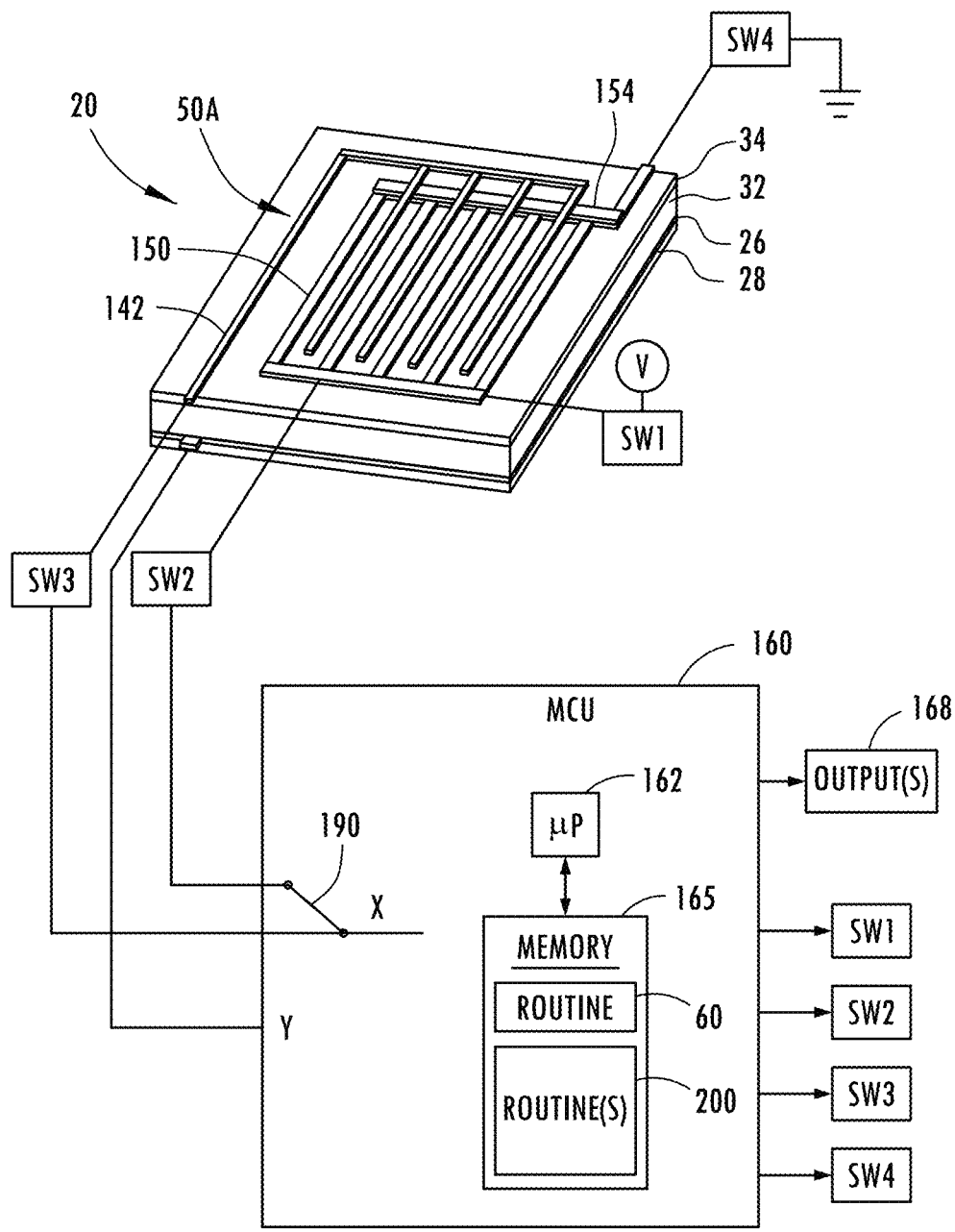
FIG. 8 is a front perspective view of the conductive circuitry shown in FIG. 5 with the controller configured to sample signals in a third capacitive sensor mode.

Referring to FIGS. 6-11, the various operating sensor modes of the electrode configurations as controlled by a controller 160 are illustrated for one embodiment of one of the sensors of the conductive circuitry 50A. As best seen in FIGS. 6-8, the controller 160 may include a microprocessor 162 and memory 165 configured with one or more routines 60, 200. The controller 160 may be a micro control unit (MCU) having firmware, according to one example. It should be appreciated that other analog and/or digital circuitry may be used to provide the controller 160. The controller 160 includes various inputs/outputs including three inputs/outputs connected to the respective signal terminals associated with the first, second and third electrodes 142, 150 and 26. Additionally, the controller 160 may generate one or more outputs 168 based on the sensed signals. For example, the controller 160 may provide proximity switch outputs based on the proximity sensing such that the capacitive proximity sensor assembly operates as one or more capacitive proximity switches, according to various examples.

Figure 9:
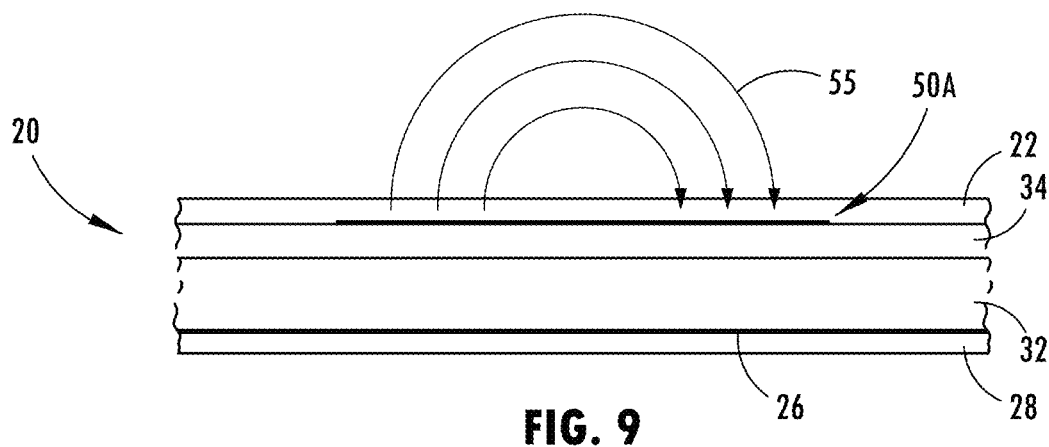
FIG. 9 is a cross-sectional view of the conductive circuitry of FIG. 5 further illustrating the electric field generated in the first capacitive sensor mode.

Referring to FIGS. 6 and 9, the conductive circuitry 50A when configured as a capacitive sensor is configured according to a first sensor mode in which the first and second electrodes 142 and 150 form a mutual capacitance with each other to serve as a first sensor that may be used to sense touch or close proximity of a user at or near the top front surface of cover 22. In this sensor mode, the third electrode 26 is open-circuited via the controller 160 so as to form a conductive shield that may enhance the mutual capacitance between the first electrode 142 and second electrode 150. The first electrode 142 may receive a drive signal X and the second electrode 150 may supply a receive signal Y. As seen in FIG. 9, the activation electric field 55 is generated due to a mutual capacitive coupling of the first and second electrodes 142 and 150 as illustrated by arrows 55 to enable the detection of touch or movement, e.g., swipe, on or above the front cover 22 (e.g., within 30 millimeters). When the conductive circuitry 50A is configured as a heater, the controllers 160 controls the switches SW1 and SW4 to apply the voltage V and a path to ground and open circuit switches SW2 and SW3.

Figure 10:
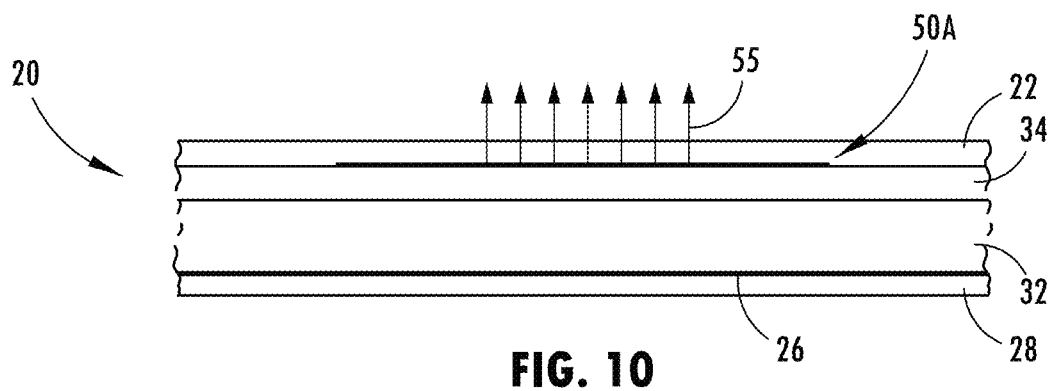
FIG. 10 is a cross-sectional view of the conductive circuitry of FIG. 5 further illustrating the electric field generated in the second capacitive sensor mode.

The controller 160 may sequentially switch the capacitive proximity sensor of the conductive circuitry 50A amongst the various sensor modes at a rapid speed simply by changing the inputs and outputs and thereby reconfiguring the sensing arrangement to sequentially provide first, second and third sensors. Referring to FIGS. 7 and 10, the conductive circuitry 50A is shown in the second sensor mode in which the first and second electrodes 142 and 150 are electrically shorted together to form a single electrode, and the third electrode 26 is driven to a desired voltage to provide a shield. To electrically short the first and second electrodes 142 and 150 together, the controller 160 may include a switch 190 that may be implemented in firmware or otherwise implemented with an analog or digital switch. In this sensor mode, the first and second electrodes 142 and 150 which are shorted together receives a self-capacitor input to generate an activation electric field illustrated by arrows 55 to form a self-capacitive second sensor as seen in FIG. 10 in which the activation electric signal may detect objects above the top front cover 32 at an extended distance (e.g., a distance up to 30 centimeters). The self-capacitor input may apply a voltage for half of a cycle to charge the electrode and may sense capacitance during the other half of the cycle.

Figure 11:
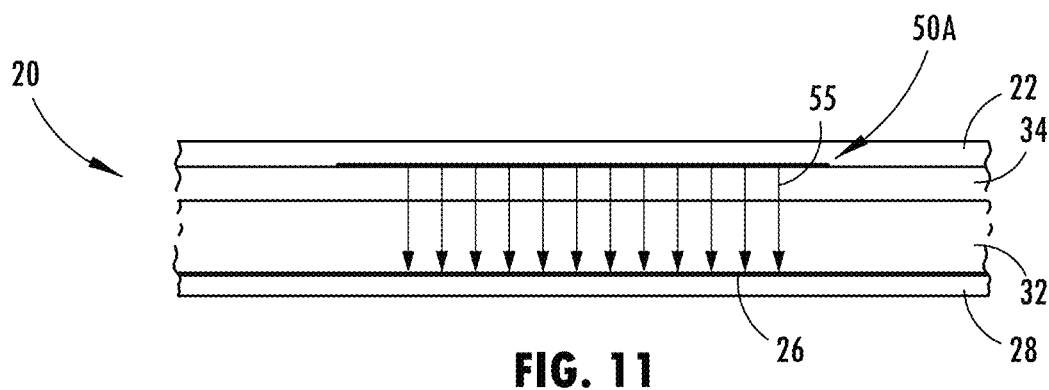
FIG. 11 is a cross-sectional view of the conductive circuitry of FIG. 5 further illustrating the electric field generated in the third capacitive sensor mode.

Referring to FIGS. 8 and 11, the conductive circuitry 50A is illustrated in the third sensor mode in which the first and second electrodes 142 and 150 are electrically shorted together via the switch 190 as controlled by controller 160 and receive the drive signal X, and the third electrode 26 supplies the receive signal Y. It should be appreciated that the short-circuited first and second electrodes 142 and 150 may receive the drive signal X to form a mutual capacitance with the third electrode 26 to provide a third sensor. As such, movement of the shorted together first and second electrodes 142 and 150 relative to third electrode due to compression of the first compliant dielectric layer 32 may be detected as an indication of the amount of force or pressure applied to the front surface of the cover 22. The activation electric field between the shorted-circuited first and second electrodes 142 and 150 and the third electrode 26 is illustrated by arrows 55 in FIG. 11.

Accordingly, it should be appreciated that the controller 40 may sequentially switch the conductive circuitry 50A-50P between the first, second and third sensor modes as illustrated in FIGS. 6-11 at a rapid pace so as to sequentially configure the conductive circuitry 50A in various sensor configurations referred to as first, second and third sensors and sample sensed signals to sense a sensed condition in each sensor mode. This may be achieved by the controller 160 switching the drive signal X and the receive signal Y between the various inputs and outputs and sampling the signals over a short period of time such as 20 milliseconds and then switching sequentially to the next sensor mode, repeatedly. As such, multiple sensors may be realized with the capacitive sensors of the conductive circuitry 50A. The sensor signals may be compared to threshold values to act as switches to trigger an output response. The sensor functions associated with one or more of each of the sensor modes may be used to detect user inputs. It should be appreciated that conductive circuitries 50B-50P may be configured and controlled by controller 160 similar to conductive circuitry 50A.

Figure 12:
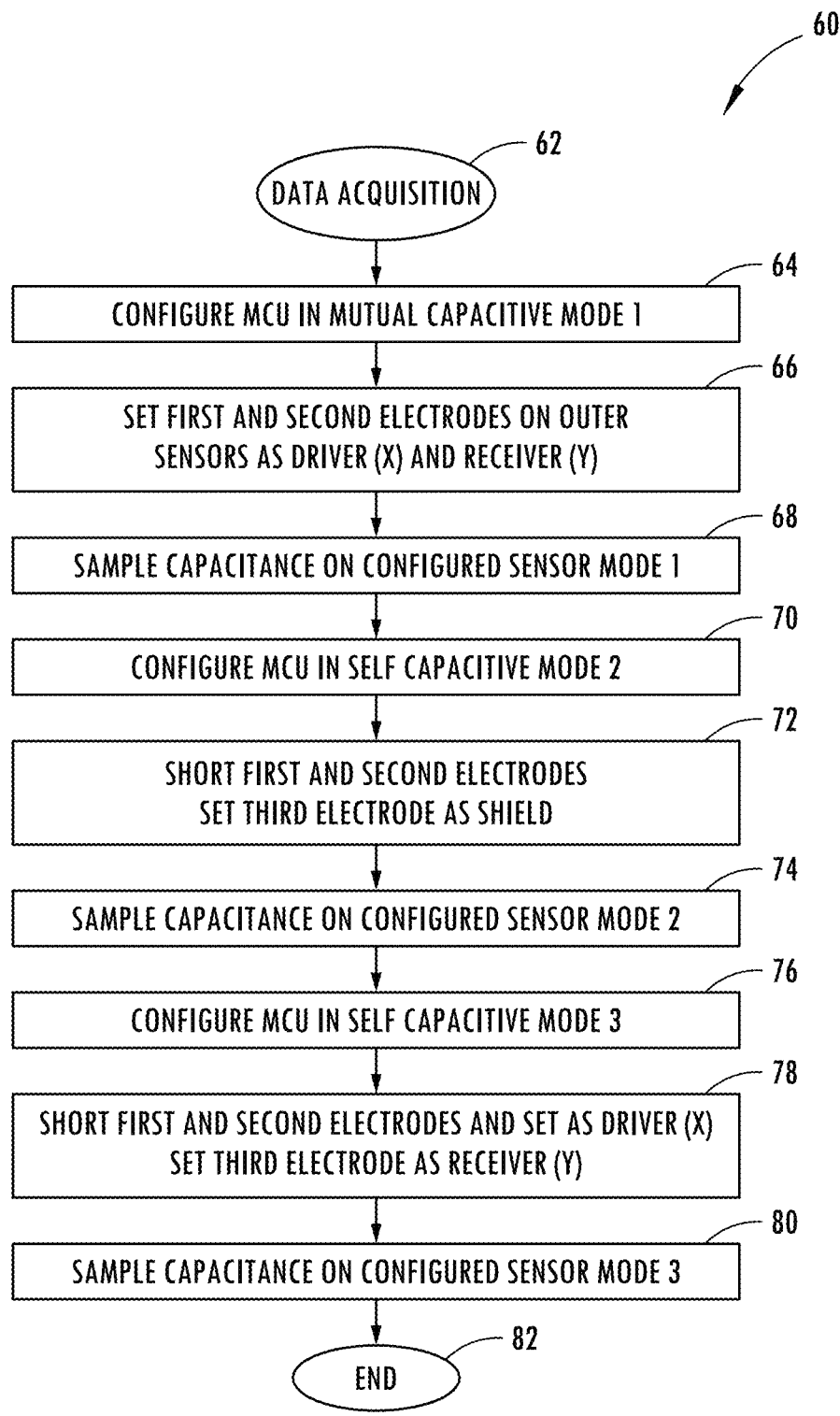
FIG. 12 is a flow diagram illustrating a route for sampling and measuring signals generated by the capacitive proximity sensor assembly of FIG. 5 in the first, second and third capacitive sensor modes.

Referring to FIG. 12, a routine 60 for controlling the controller 160 to sequentially switch the conductive circuitry 50A amongst the various sensor operating modes is illustrated, according to one embodiment. The routine 60 is shown for operating the conductive circuitry 50A according to the first embodiment in each of sensor modes 1-3. It should be appreciated that the routine 60 may be executed by the microprocessor 162 in the controller 160 and that the routine 60 may be stored in memory 165. The routine 60 may sample data and reconfigure the conductive circuitry 50A in the various modes at a sampling rate of about 20 milliseconds, according to one example. It should be appreciated that other sampling rates may be employed.

Routine 60 begins at step 62 to acquire data and then proceeds to step 64 to configure the controller in a first mutual capacitance sensor mode 1. In sensor mode 1, routine 60 proceeds to step 66 to set the first electrode with the drive signal X and to set the second electrode with the drive receive signal Y, and may set the third electrode as a shield. Thereafter, routine 60 proceeds to step 68 to sample the capacitance on the configured mutual capacitance sensor in sensor mode 1. Sensor mode 1 may sense touch commands which may be used to activate the heater.

Next, routine 60 proceeds to step 70 to configure the controller in a self-capacitance sensor mode 2. In mode 2, routine 60 proceeds to step 72 to electrically short-circuit the first and second electrodes together, and to set the third electrode as a shield. The shorted together first and second electrodes receive a self-capacitance input signal. Next, at step 74, routine 60 samples the capacitance of the configured self-capacitance sensor in sensor mode 2. Sensor mode 2 may be used to determine detection of an object proximate to the sensor.

Next, routine 60 proceeds to step 76 to configure the controller in a mutual capacitance sensor mode 3. This includes electrically short-circuiting the first and second electrodes together and setting the combined first and second electrodes with the drive signal X, and setting the third electrode with the receive signal Y in step 78. Next, in step 80, the capacitance of the configured mutual capacitance sensor in sensor mode 3 is sampled before ending at step 82. Sensor mode 3 may detect pressure applied by a user to the steering wheel and may be used to activate the heater and increase or decrease the heating.

It should be appreciated that the routine 60 may be repeated sequentially at a rapid pace, such that the sampling between the execution of the sensor configurations in modes 1, 2 and 3 may occur at a sampling rate of 20 milliseconds, for example. As a result, the conductive circuitry is able to operate sequentially in multiple modes with different configurations of capacitive sensors to sense various signals, particularly objects and input commands in different sensor modes pursuant to the first embodiment.

Figure 13:
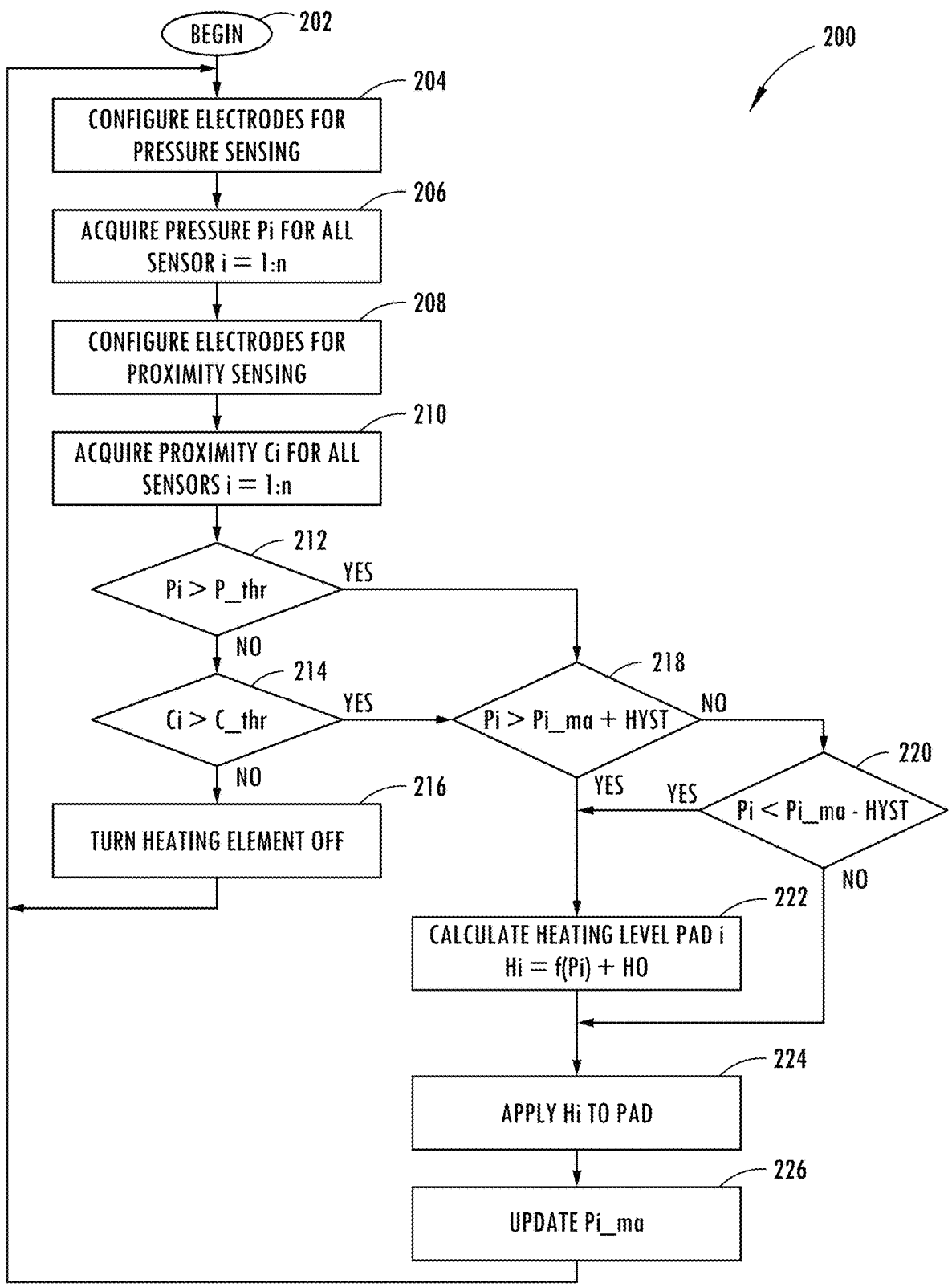
FIG. 13 is a flow diagram illustrating a routine for sensing a hand in contact with the steering wheel and controlling the heaters.

Referring to FIG. 13, a routine 200 is illustrated for sensing touch and pressure and heating the one or more heating zones with the conductive circuitry, according to one embodiment. Routine 200 begins at step 202 and proceeds to step 204 to configure the electrodes for each conductive circuitry for pressure sensing in the pressure sending mode. Next, at step 206, routine 200 acquires the pressure $P_i$ for each sensor i=1:n. Next, routine 200 configures the electrodes for each sensor for proximity sensing in a capacitive touch sensing mode and then acquires the proximity or touch $C_i$ for each sensor i=1:n.

Following the acquisition of the pressure and touch signals, routine 200 proceeds to decision step 212 to determine if the acquired pressure $P_i$ is greater than a threshold $P\_thr$ for each sensor configured with the conductive circuitry. If the acquired pressure $P_i$ is not greater than the threshold, routine 200 proceeds to decision step 214 to determine if the acquired proximity signal is greater than a threshold $C\_thr$ and, if not, turns the heating element off for the associated conductive circuitry, and then returns to step 204.

If the acquired pressure Pi is greater than the threshold P_thr or if the acquired proximity signal Ci is greater than the threshold C_thr, then routine 200 proceeds to decision step 218 to determine if the acquired pressure Pi is greater than a moving average of sensor i pressure level Pi_ma plus a hysteresis level HYST. The hysteresis level HYST is a level the signal needs to exceed before changing the heating level. If Pi is not greater than Pi_ma+HYST, then routine 200 proceeds to decision step 220 to determine if the acquired pressure Pi is less than Pi_ma−HYST. If the acquired pressure Pi is greater than Pi_ma+HYST or is less than Pi_ma−HYST, indicative that the pressure is either increasing or decreasing, respectively, then routine 200 proceeds to step 222 to calculate a heating level for the corresponding pad i for the conductive circuitry. The calculated heating level identified by equation Hi is a function of f(Pi) plus a minimum heating level on the steering wheel when the hand is detected on the corresponding conductive circuitry. As such, increases or decreases in sensed pressure may respectively increase or decrease the heating level generated by the corresponding conductive circuitry for each heating zone.

If the acquired pressure Pi is not greater than Pi_ma+HYST and is not less than Pi_ma−HYST, indicative of no change in pressure, then routine 200 proceeds directly to step 224 to apply the heating level Hi to the corresponding pad of the conductive circuitry. Thereafter, routine 200 proceeds to step 226 to update threshold Pi_ma with the moving average of the sensor i pressure level before returning to step 204.

Accordingly, the vehicle steering wheel 20 advantageously employs a plurality of conductive circuitries 36A-36H surrounding at least a portion of the core structure at plural heating zones of the steering wheel 20 to be configured as one or more sensors to sense the location of the user's hands on the steering wheel and to be configured as the plurality of heaters to activate the one or more selected heaters based on the sensed location of the hand. This advantageously consumes a minimal amount of power necessary to heat the steering wheel without wasting energy, thereby conserving electrical power.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle steering wheel comprising:
a rim having a core structure;
a plurality of heating zones surrounding at least a portion of the core structure, each heating zone having conductive circuitry to define a heater and a capacitive sensor for sensing location of a user's hand on the steering wheel, wherein the conductive circuitry comprises a first electrode comprising a first plurality of electrode fingers and a second electrode comprising a second plurality of electrode fingers, and wherein the first plurality of conductive fingers are interdigitated with the second plurality of conductive fingers; and
a controller controlling the conductive circuitry in each heating zone to operate as the capacitive sensor to sense a presence of the user's hand in at least one heating zone and to reconfigure the conductive circuitry to operate as the heater to heat the at least one heating zone when the hand is sensed in the at least one heating zone.

2. The vehicle steering wheel of claim 1, wherein the conductive circuitry operating as the capacitive sensor also operates as the heater.

3. The vehicle steering wheel of claim 2 further comprising switching circuitry for selectively switching operation of the conductive circuitry between the capacitive sensor and the heater.

4. The vehicle steering wheel of claim 3, wherein the controller controls the switching circuitry to switch operation of the conductive circuitry between the capacitive sensor and the heater.

5. The vehicle steering wheel of claim 1 further comprising a third electrode and a compliant layer disposed between each of the first and second electrodes and the third electrode.

6. The vehicle steering wheel of claim 5, wherein the controller senses pressure applied to the heating zone and adjusts the heating level based on the sensed pressure.

7. The vehicle steering wheel of claim 1, wherein the conductive circuitry comprises at least one electrode that generates a capacitive signal for the capacitive sensor and generates heat for the heater.

8. The vehicle steering wheel of claim 1 further comprising a cover wrap surrounding the conductive circuitry.

9. The vehicle steering wheel of claim 1, wherein the heater operates as a resistive heater that generates heat based on electric current.

10. The vehicle steering wheel of claim 9, wherein the conductive circuitry comprises an electric heater mat.

11. The vehicle steering wheel of claim 1, wherein the core structure comprises a rigid core and a surrounding compliant layer.

12. A vehicle steering wheel comprising:
a rim having a core structure;
a plurality of heating zones surrounding at least a portion of the core structure, each heating zone having conductive circuitry to define a heater and a capacitive sensor for sensing location of a user's hand on the steering wheel, wherein the capacitive sensor comprises a first electrode comprising a first plurality of electrode fingers and a second electrode comprising a first second plurality of electrode fingers, and wherein the first plurality of conductive fingers are interdigitated with the second plurality of conductive fingers;
a cover wrap surrounding the plurality heating zones; and
a controller controlling the circuitry in each heating zone to operate as the capacitive sensor to sense a presence of the user's hand in at least one heating zone and to reconfigure the conductive circuitry to operate as the heater to heat the at least one heating zone when the hand is sensed in the at least one heating zone.

13. The vehicle steering wheel of claim 12, wherein the conductive circuitry operating as the capacitive sensor also operates as the heater.

14. The vehicle steering wheel of claim 13 further comprising switching circuitry for selectively switching operation of the conductive circuitry between the capacitive sensor and the heater.

15. The vehicle steering wheel of claim 14, wherein the controller controls the switching circuitry to switch operation of the conductive circuitry between the capacitive sensor and the heater.

16. The vehicle steering wheel of claim 15, wherein the conductive circuitry comprises at least one electrode that generates a capacitive signal for the capacitive sensor and generates heat for the heater.

17. The vehicle steering wheel of claim 12, wherein the core structure comprises a rigid core, a third electrode, and a surrounding compliant layer disposed between each of the first and second electrodes and the third electrode to sense pressure applied to the heating zone and adjusts the heating based on the sensed pressure.

18. The vehicle steering wheel of claim 12, wherein the heater operates as a resistive heater that generates heat based on electric current.

\* \* \* \* \*